United States Patent Office 2,706,869
Patented Apr. 26, 1955

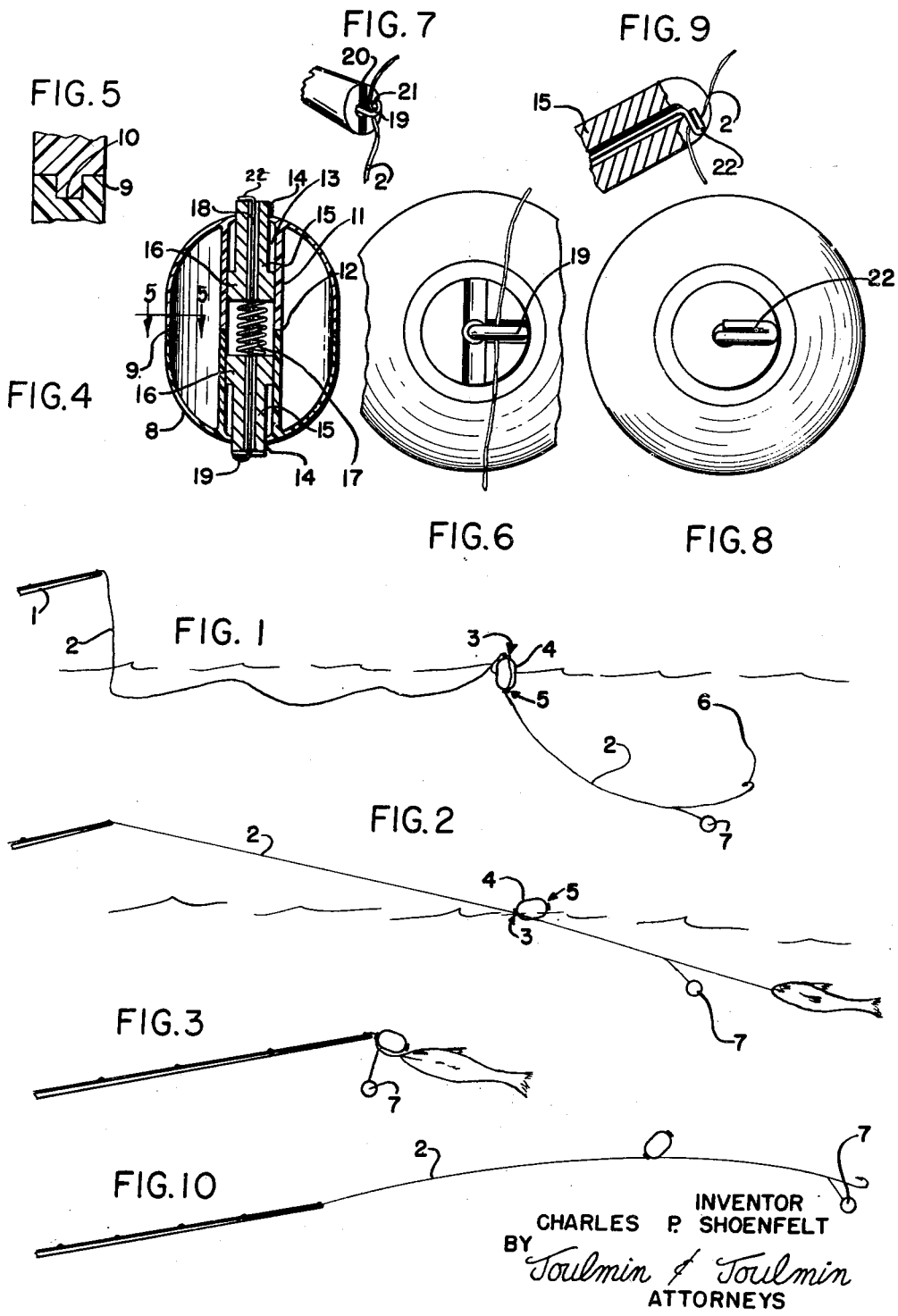

2,706,869

FISHING FLOAT

Charles F. Shoenfelt, Tipp City, Ohio

Application May 12, 1951, Serial No. 226,022

4 Claims. (Cl. 43—44.87)

The present invention relates to fishing floats.

In the fishing art, there is a need for a practical form of float, one which is inexpensive but of sturdy construction, and which lends itself to still fishing as well as casting.

Floats are known to the art in which one end of the float becomes disengaged from the line by the pull of the fish to permit the float to slide along the line as far as a hooked fish. This allows the entire length of line between the tip of the pole and the hook to be reeled in, thus assuring the catch. However, floats of this general character are complicated, therefore expensive, and often the releasable device gets caught or otherwise becomes inoperative, usually at the most inopportune time.

The main object of the present invention is to provide an improved float of inexpensive construction which can be made of moldable material, such as plastic, rubber, etc.

Another object is to provide an improved float of a releasable character in which the release is positive and never fouls, by constructing the releasing device of quick-acting and the fewest number of parts.

Still another object is to provide an improved float which combines the function of being quickly releasable when still fishing with the function of permitting the float to readily slide along the line and thereby give the necessary whip to a line when casting.

A further object is to provide a float that can be attached at both ends to the line and has an external configuration such that the line passing from one end to the other prevents the float from twisting about the line.

Another object is to provide a float formed of two identical molded portions secured together at the circumferential median line and having a line-attaching device at one end and a line-releasing device at the other end.

Another object is to provide a float with a line-releasable device at one end and having a spherical contour over which the line passes to the other end of the float in order to furnish a more powerful releasing action when a fish tugs on the line.

Still another object is to provide a float having a compressible core surrounding a wire-attaching and detaching device, the line being secured to said device at each end of the float by compressing the core.

A further object is to provide a float with a line-releasable device at one end, and an eye at the other end for loosely receiving a fish line in casting when the line-releasable device is not temporarily being used.

An additional object is to provide a float with a spring-pressed line-releasable device at one end and a spring-retaining eye at the other end for loosely receiving a fish line in casting when the spring-pressed line-releasable device is not temporarily being used.

The final object of the invention is to provide an improved float which has equal facility of being used for still fishing and for casting; when still fishing, one end of the float is automatically released from the line due to the pull of the fish, and when casting, the float is adapted to slide along the line to facilitate the casting operation.

The invention will be better understood when reference is made to the following description and the accompanying drawings in which:

Figure 1 depicts diagrammatically the use of the improved float, and particularly indicating the manner in which the line prevents the float from spinning.

Figure 2 is a view similar to Figure 1, but showing how the pull of a fish causes one end of the float to become disengaged from the line to permit the float to slide along the line.

Figure 3 is a diagrammatic illustration depicting the manner in which the hooked fish can be reeled up to the end of the pole.

Figure 4 is a longitudinal sectional view of the improved float showing the internal parts with the spring and wire in elevation.

Figure 5 is a greatly enlarged fragmentary view of the peripheral joint between the halves of the float.

Figure 6 represents an enlarged plan view of the float, looking at the end thereof through which the line is slidingly threaded.

Figure 7 is a fragmentary perspective view of the float shown in Figure 6.

Figure 8 is an enlarged view looking toward the end of the float opposite that shown in Figure 6.

Figure 9 is a fragmentary perspective and partly sectional view of the end of the float shown in Figure 8, exemplifying the manner in which the line is temporarily attached until released by the pull of a fish.

Referring to Figure 1, reference character 1 designates a fishing pole which is equipped with the usual form of reel (not shown). A line 2 is taken from the reel and is threaded through an eye 3 of a float 4, the line passing along the exterior of the float to a line-releasing device 5. The line is provided with the usual array of hooks indicated at 6, and if desired, a sinker 7.

When a fish is caught and tugs on the line as indicated in Figure 2, the line is released from the lower end of the float 4, leaving the line passing solely through the upper eye and the float is then permitted to slide along the line down as far as the sinker or the fish. Thus, as shown in Figure 3, when the line is reeled in, the fish, sinker and float can be brought up tight to the end of the pole. It will be apparent that if the float were not permitted to slide along the line the fish necessarily could not be reeled to the end of the pole and would have to be caught in a net or gaffed, either of which operations does not lend certainty to landing a fish.

Thus, the invention pertains more especially to an improved type of float which permits the operations above discussed and yet requires no complications of structure, expensive parts or any tedious manipulation by the user.

Referring now to Figure 4, it will be noted that the float comprises a hollow body 8 constituted of relatively thin water impervious material, such as plastic, hard rubber, compounds of silica, etc. This material should preferably be capable of being molded to form. In order to derive the hollow interior, the float is preferably made or molded in two parts with the joint at the middle, indicated at 9, and then cemented or in any other manner secured together. In the event that the float is constituted of wood chiseled out to suitable shape, the parts can be glued together at the joint. As shown in Figure 5, this joint 9 may comprise a tongue and groove arrangement 10 with the tongue positioned midway between the inner and outer surfaces of the float body fitted tightly within its groove so as to assure a completely water-proof joint when cement, glue or other securing material is applied.

Extending longitudinally through the center portion of the float and joined integrally therewith, is a core 11 which as in the case of the outer portion of the float has a joint at 12 which can be cemented or glued if desired. The core 11 is constituted preferably of the same material as the outer portion of the float. This core has an opening 13 extending therethrough leaving a thin wall of core and in addition there is an opening 14 preferably of smaller size than the interior of the core at each end of the float. A pair of opposed plungers 15 are snugly but slidably contained within the opening 13, these plungers having a head portion 16 of larger diameter than the shank portion and the latter extends slidably through the openings 14. The purpose of providing each plunger with different diametral sizes is to reduce to a minimum any friction between the plunger and the interior of the core when the plungers are pressed together for purposes as will be explained hereinafter.

The plungers are spaced apart at the center of the float and are held in this spaced position by a compression spring 17. The length of the plungers is such that under normal conditions the shanks of the plungers extend a short distance beyond the upper and lower ends of the float.

The plungers are each provided with an axial bore which loosely receives a stiff wire 18 passing through the entire length of the float and also through the interior of the spring 17. This wire terminates at the lower end in a circular hook portion 19, the end of the hook resting against the lower surface of the lower shank portion. In order to prevent the wire 18 from turning within the aligned bores of the plungers, I may provide a diametral slot 20 extending across the lower shank surface and also a shorter slot 21 extending at right angles to the slot 20. The hook portion 19 can rest in one of these slots and the latter will prevent the wire from twisting. However, the depth of the hook portion is such that even when resting in the slot there is a sufficient space left to constitute an eye through which the line 2 can be threaded without any friction.

The other end of the wire 18 terminates preferably in a U-shaped portion 22 in which the legs are pinched together as indicated in Figure 8 and there are preferably no slots provided at the upper end of the upper shank of the plunger. The U-shaped portion of the wire serves as a temporary clamp for the line 2, as indicated in Figure 9, this line being released from the clamp when a fish tugs at the hook. It is, therefore, highly desirable that the end of the upper shank shall be as smooth as possible so as to offer no obstruction to the sliding movement of the clamped portion of the line in releasing itself from the wire.

In order to assure the proper degree of clamping effect at the upper end of the float in which the pressure exerted by the U-shaped portion of the wire must be carefully ascertained depending on the weight of the line, the entire length of the wire 18 and the strength of the spring 17 which tends to push the plungers outwardly away from one another and therefore against the wire portions 19 and 22 must be predetermined. In order to insert the line 2 under the U-shaped wire portion 22, it is simply necessary for the fisherman to press the lower plunger 15 together with the wire 18 upwardly against the spring 17 while pressing the finger against the outer end of the upper plunger so as to expose sufficient space between the bent wire portion and the end of the upper plunger shank. When the plunger 16 is released, the spring will cause the bent wire portion 22 and the lower plunger to return to their original positions and thereby exert a clamping effect on the line as against the surface of the upper plunger. In the same manner, the upper plunger and the wire end 22 are pressed downwardly against the spring 17 while holding the outer end of the lower plunger stationary in order to provide sufficient space between the hook portion 19 of the wire and the end of the lower plunger through which to pass the line. However, as explained hereinbefore, this line is freely movable through the eye of the hook portion even when the latter returns to one of the slots 20, 21.

In operation, the line at the pole end is first threaded through the eye formed by the hook portion 19 of the wire after the upper plunger (Fig. 4) has been depressed in the manner stated hereinbefore and pressure exerted endwise of the wire. The line is then brought around the outer surface of the float and is clamped under the U-shaped portion 22 of the wire as indicated in Figure 1 after the lower plunger has been similarly depressed and the wire 18 moved upwardly. From the U-shaped portion the line proceeds to the hook array and sinker elements. It has been found in practice that by reason of the fact that the wire 18 cannot rotate within the plungers, due to the slots 20, 21 and also on account of the considerable friction developed between the line and the outside surface of the float in passing over the curved contour thereof, the float is restrained from any twisting effect even under choppy water conditions.

As a fish tugs at the hook, the float will naturally bob and will momentarily position itself such that the pull by the fish will cause the line to be released from under the U-shaped wire portion 22. As stated hereinbefore, the strength of the spring 17 has been predetermined as to produce just the right amount of clamping effect at the wire portion 22 that will permit the fish to take the line from under this portion. The condition of releasing the line from the wire is illustrated in Figure 2 in which the line now merely threads through the eye at wire portion 19 allowing the float to move freely along the line. Thus, on continued reeling in of the line, the float, sinker and the fish are brought close to the end of the pole as indicated in Figure 3, thus assuring safety of the catch. The shortness of the line between the end of the pole and the mouth of the fish prevents any appreciable thrashing around by the fish where it might otherwise break away from the line.

In resetting the line, it is simply necessary to again attach the latter under the U-shaped portion 22 of the wire at the proper distance from the hook array and the sinker. It has been found in practice that even when the line is repeatedly clamped under the wire portion 22 and successively released by the pull of fish, little or no damage is caused to the line. Any possibility of damage is minimized by providing the two adjacently positioned lengths of wire at the U-shaped portion, thus eliminating any sharp edges. It is further apparent that the fact that the line extends over a long circular path formed by the spherical contour of the float presents the line to the U-shaped portion 22 of the wire in such a position as to be readily releasable therefrom. Thus the line approaches the portion 22 from the float side in the same direction as it has when clamped by this portion, and even the smallest tug by a fish is sufficient to release the lower end of the float.

Another feature of my improved float is that the same structure can be used for casting as illustrated in Figure 9. Only the lower plunger (Figure 4) is used for this purpose, in that the line 2 is threaded through the eye of the hook portion 19 which allows the float to slide along the line and act as a movable weight and give a whipping effect and direction to the line. Thus, a single float can be used for both still fishing and casting. In one case, both ends of the float are employed in the manner described hereinbefore, and in the other case, only one end is used.

While preferred, specific embodiments of the invention are hereinbefore set forth, it is to be clearly understood that the invention is not to be limited to the exact construction, mechanisms, and devices illustrated and described, because various modifications of these details may be provided putting the invention into practice within the purview of the appended claims.

Having thus fully described my invention, what I claim as new and desire to secure by Letters Patent is:

1. A fishing float comprising a hollow member having a hollow core extending through the float, a pair of oppositely pressed spring mounted plungers in said core, a rod passing through the core and plungers, said rod terminating at one end in a short length portion bent at right angles with respect to the remainder of the rod, said portion lying substantially over its entire length and held tightly pressed against the outer end of one of the plungers to detachably and frictionally hold a fish line between the rod and said outer end of the plunger, the other end of the rod terminating in a hook portion which extends outwardly from the outer end of the other of the plungers and is in contact with said other plunger but leaving sufficient space between the hook portion and plunger to permit free passage of the fish line therebetween.

2. A fishing float comprising a hollow member having a tubular core extending through the float and terminating in aligned openings at the outer surface of the float, a pair of aligned plungers slidable within said core, means for retaining said plungers in said core, a compression spring interposed between and acting against adjacent ends of the plungers, said plungers having aligned openings extending therethrough, and a rigid wire passing through the plunger openings and spring to the exterior of the float, said wire having a bend at each end, the outer ends of said plungers being normally pressed against the corresponding bends in said wire ends.

3. A fishing float comprising a hollow spherical member having a tubular core extending through the float and terminating in aligned openings at the outer surface of the float, a pair of aligned plungers slidable within said core, means for retaining said plungers in said cores, a compression spring interposed between and acting against adjacent ends of the plungers, said plungers having aligned openings extending therethrough, and a rigid wire passing through the plunger openings and spring to the exterior of the float, said wire having a bend at right angles at one end and terminating in a semi-circular hook at the other end, the outer ends of said plungers being normally pressed against said bend portion of the wire and against the end of the semi-circular hook portion of the wire by the action of said spring.

4. A fishing float comprising a hollow spherical member having a tubular core extending through the float and terminating in aligned openings at the outer surface of the float, a pair of aligned plungers slidable within said core, a compression spring interposed between adjacent ends of the plungers, means for limiting the outward movement of each of said plungers, said plungers having aligned openings extending therethrough, and a rigid wire passing through the plunger openings and spring to the exterior of the float, said wire terminating at one end in a semi-circular hook portion, the outer end of said plunger nearer said hook being normally pressed against the hook portion by the action of said spring and said outer end having a slot extending across the surface thereof in which said hook portion of the wire rests.

References Cited in the file of this patent

UNITED STATES PATENTS

| | | |
|---|---|---|
| 360,418 | Clark | Apr. 5, 1887 |
| 575,674 | Woodward | Jan. 19, 1897 |
| 1,371,170 | Johnson | Mar. 8, 1921 |
| 1,444,754 | Pruden | Feb. 6, 1923 |
| 2,143,942 | Gruenhagen | Jan. 17, 1939 |
| 2,231,270 | Huston | Feb. 11, 1941 |
| 2,255,853 | Makus et al. | Sept. 16, 1941 |
| 2,444,791 | Stahnke | July 6, 1948 |
| 2,516,657 | Spendlove | July 25, 1950 |